(12) United States Patent
O'Brien et al.

(10) Patent No.: US 11,370,529 B2
(45) Date of Patent: Jun. 28, 2022

(54) AERIAL VEHICLE TURBINE SYSTEM

(71) Applicant: Walmart Apollo, LLC, Bentonville, AR (US)

(72) Inventors: John J. O'Brien, Farmington, AR (US); Samantha M. O'Brien, Bella Vista, AR (US); Trey Bishop, Bentonville, AR (US); Todd Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 426 days.

(21) Appl. No.: 16/366,284

(22) Filed: Mar. 27, 2019

(65) Prior Publication Data

US 2019/0300157 A1 Oct. 3, 2019

Related U.S. Application Data

(60) Provisional application No. 62/650,032, filed on Mar. 29, 2018.

(51) Int. Cl.
*B64C 15/12* (2006.01)
*B64D 27/20* (2006.01)
(Continued)

(52) U.S. Cl.
CPC ............ *B64C 15/12* (2013.01); *B64C 39/024* (2013.01); *B64D 27/20* (2013.01);
(Continued)

(58) Field of Classification Search
CPC .............. B64C 15/12; B64C 2201/027; B64C 2201/108; B64C 2201/16; B64C 39/024;
(Continued)

(56) References Cited

U.S. PATENT DOCUMENTS 3,524,611 A * 8/1970 Kurt ..................... B64C 29/0075
244/53 B
3,885,891 A * 5/1975 Throndson .............. F04D 25/08
417/196
(Continued)

FOREIGN PATENT DOCUMENTS

CN 204916161 U 12/2015
KR 20170090797 A 8/2017
(Continued)

OTHER PUBLICATIONS

Red Dot, "Bladeless Drone", red dot award design concept, 2017, pp. 1-5.
(Continued)

*Primary Examiner* — Medhat Badawi
(74) *Attorney, Agent, or Firm* — Duane Morris LLP; Manita Rawat

(57) ABSTRACT

A propeller-less unmanned aerial vehicle having a body having a plurality of channels, an inlet formed in the body and configured to allow air flow to enter the plurality of channels from an exterior of the body, an anechoic chamber formed in the body and coupled to the plurality of channels, a rotor comprising a plurality of angled fins located in the anechoic chamber, a control system configured to direct air flow within the plurality of channels, and one or more circular tubes coupled to the exterior of the body and in communication with the plurality of channels. The air flows into the body through the inlet, into the plurality of channels and the anechoic chamber, and exits through the one or more circular tubes to provide lift and directional control to the propeller-less unmanned aerial vehicle.

19 Claims, 2 Drawing Sheets

US 11,370,529 B2

Page 2

(51) Int. Cl.
*B64C 39/02* (2006.01)
*F04D 29/54* (2006.01)
*F04D 19/00* (2006.01)
*F04D 29/38* (2006.01)

(52) U.S. Cl.
CPC .. *B64C 2201/027* (2013.01); *B64C 2201/108* (2013.01); *F04D 19/002* (2013.01); *F04D 29/384* (2013.01); *F04D 29/545* (2013.01)

(58) Field of Classification Search
CPC ....... B64D 27/20; F04D 19/002; F04D 25/08; F04D 29/384; F04D 29/545; F04F 5/42
See application file for complete search history.

(56) References Cited

U.S. PATENT DOCUMENTS

| | | | | |
|---|---|---|---|---|
| 4,192,461 | A * | 3/1980 | Arborg | F02K 1/36 239/265.17 |
| 4,448,354 | A * | 5/1984 | Reznick | B64C 29/00 239/265.17 |
| 5,735,683 | A * | 4/1998 | Muschelknautz | F23G 7/085 239/419.5 |
| 7,931,449 | B2 * | 4/2011 | Fitton | F04D 33/00 417/84 |
| 8,191,820 | B1 * | 6/2012 | Westra | B64C 39/10 244/36 |
| 8,197,226 | B2 * | 6/2012 | Fitton | F04D 25/08 417/198 |
| 8,734,094 | B2 * | 5/2014 | Wallace | F04D 15/0218 415/175 |
| 8,734,121 | B2 * | 5/2014 | Tsen | F04D 25/08 417/76 |
| 8,873,940 | B2 * | 10/2014 | Wallace | F04D 25/08 392/367 |
| 8,967,980 | B2 * | 3/2015 | Fitton | F04D 25/08 417/178 |
| 9,011,116 | B2 * | 4/2015 | Li | B05B 9/01 417/423.14 |
| 9,127,689 | B2 * | 9/2015 | Gammack | F04D 25/08 |
| 9,127,855 | B2 * | 9/2015 | Staniforth | F04F 5/16 |
| 9,217,445 | B2 * | 12/2015 | Lo | F04D 25/08 |
| 9,249,809 | B2 * | 2/2016 | Nock | B03C 3/383 |
| 9,328,739 | B2 * | 5/2016 | Atkinson | F01D 25/00 |
| 9,513,028 | B2 * | 12/2016 | Gammack | F04D 29/601 |
| 9,568,006 | B2 * | 2/2017 | Johnson | F04D 25/06 |
| 9,741,575 | B2 * | 8/2017 | Lin | C23C 16/4558 |
| 9,745,981 | B2 * | 8/2017 | Dos Reis | F24F 7/007 |
| 9,745,996 | B2 * | 8/2017 | Nurzynski | F04D 17/06 |
| 9,752,789 | B2 * | 9/2017 | Staniforth | F04F 5/46 |
| 9,797,414 | B2 * | 10/2017 | Hodgson | F04F 5/48 |
| 9,816,531 | B2 * | 11/2017 | Simmonds | F04D 29/403 |
| 9,927,136 | B2 * | 3/2018 | Staniforth | F24F 6/14 |
| 9,938,855 | B2 * | 4/2018 | Alecu | F02K 3/06 |
| 9,982,677 | B2 * | 5/2018 | Beavis | F04D 19/002 |
| 10,094,392 | B2 * | 10/2018 | Poulton | F04F 5/16 |
| 10,100,836 | B2 * | 10/2018 | Stickney | F04D 19/002 |
| 10,145,583 | B2 * | 12/2018 | Leow | F04F 5/48 |
| 10,207,812 | B2 * | 2/2019 | Evulet | B64C 15/00 |
| 10,408,478 | B2 * | 9/2019 | Staniforth | F24F 6/12 |
| 10,428,837 | B2 * | 10/2019 | Atkinson | F04D 25/08 |
| 10,464,668 | B2 * | 11/2019 | Evulet | B64C 21/00 |
| 10,465,928 | B2 * | 11/2019 | Staniforth | F04D 25/08 |
| D868,627 | S * | 12/2019 | Evulet | D12/4 |
| 10,612,565 | B2 * | 4/2020 | Staniforth | F04D 25/08 |
| 10,900,672 | B2 * | 1/2021 | Minola | F24F 1/0029 |
| 2007/0252032 | A1 * | 11/2007 | Lawson | B64D 27/20 244/12.3 |
| 2009/0060710 | A1 * | 3/2009 | Gammack | F04D 25/08 415/90 |
| 2010/0226769 | A1 * | 9/2010 | Helps | F04F 5/46 415/208.1 |
| 2011/0168809 | A1 * | 7/2011 | Smith, III | F02K 1/002 239/265.23 |
| 2014/0328666 | A1 * | 11/2014 | Christopher | F01D 1/34 415/1 |
| 2015/0218963 | A1 * | 8/2015 | Alecu | F02K 3/06 415/1 |
| 2016/0229530 | A1 * | 8/2016 | Welsh | A63H 27/12 |
| 2017/0159674 | A1 * | 6/2017 | Maciolek | F04D 29/547 |
| 2019/0127065 | A1 * | 5/2019 | Capunay | B64C 29/0075 |
| 2019/0168866 | A1 * | 6/2019 | Tovkach | B64C 27/50 |
| 2019/0300150 | A1 * | 10/2019 | O'Brien | B64C 39/024 |

FOREIGN PATENT DOCUMENTS

| | | |
|---|---|---|
| KR | 20170121527 A | 11/2017 |
| WO | 20170187276 A2 | 11/2017 |

OTHER PUBLICATIONS

Amit Katwala, "Bladeless propulsion could open the skies for flying cars", Institution of Mechanical Engineers, Jun. 29, 2017, pp. 1-9.
Matt Hickman, "Smooth operator: Dyson bladeless fans now quieter, more efficient", Mother Nature Network, Mar. 12, 2014, pp. 1-5.
William Herkewitz, "How Scientific Sea Drones Are Becoming the Eyes of the Navy", Popular Mechanics, Dec. 11, 2013, pp. 1-10.
AirShip Technologies Group, "Survival Air Stretcher", 2017, pp. 1-5.
C. Bombardier, "Ice Jet", Jun. 14, 2013, pp. 1-5.
Troy Turner, "The Dyson of Drones", Yanko Design, Aug. 18, 2017, pp. 1-3.
Dyson, "Dyson Cool Desk Fan Technology", Apr. 6, 2017, pp. 1-4.
International Search Report and Written Opinion dated Jun. 14, 2019, issued in corresponding PCT Application No. PCT/US2019/024289.

* cited by examiner

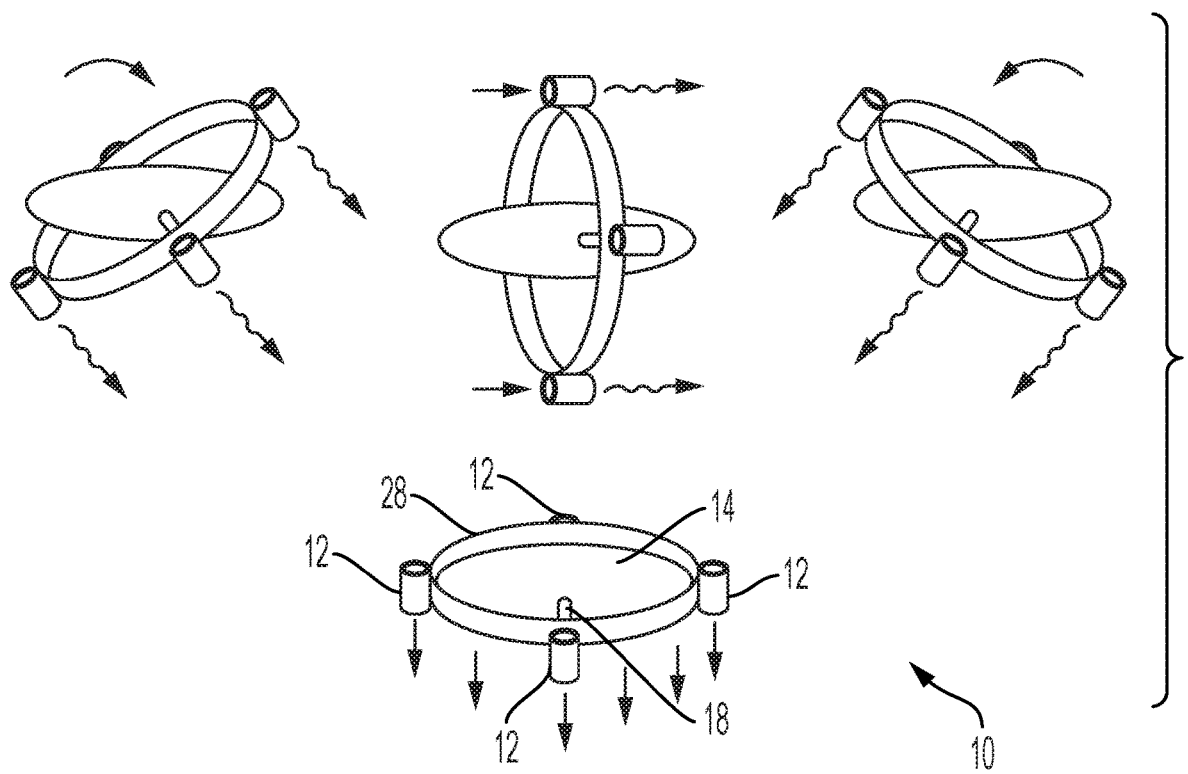
FIG. 3
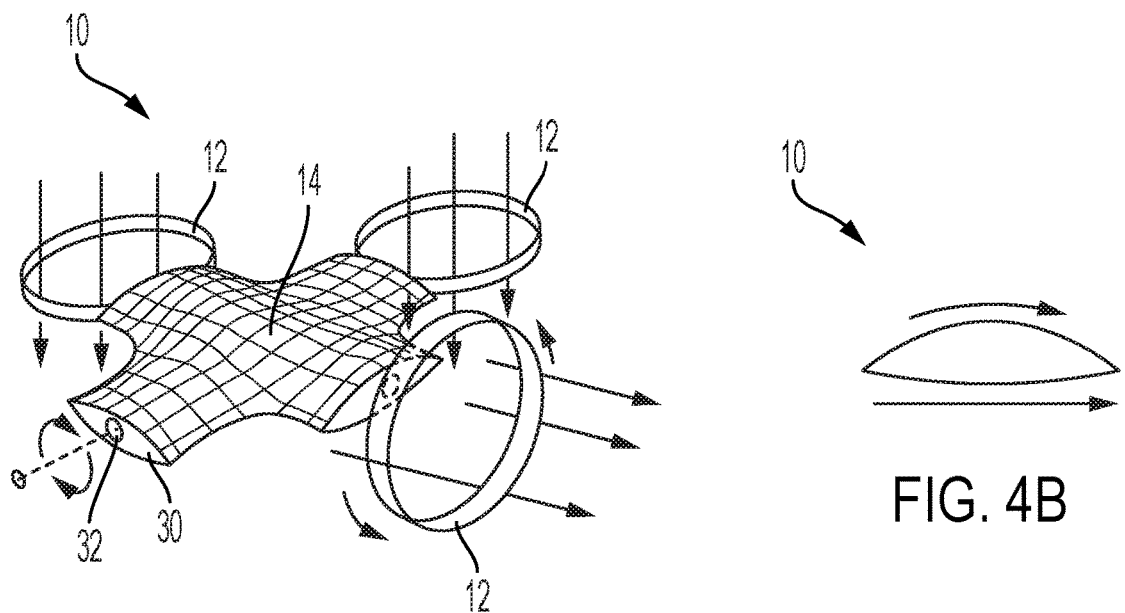
FIG. 4A
FIG. 4B

US 11,370,529 B2

AERIAL VEHICLE TURBINE SYSTEM

CROSS REFERENCE TO RELATED APPLICATIONS

This present Patent Application claims priority benefit from U.S. Provisional Patent Application No. 62/650,032 filed on Mar. 29, 2018, the entire content of which is hereby incorporated herein by reference.

TECHNICAL FIELD OF THE INVENTION

The present invention relates generally to a propeller-less unmanned aerial vehicle turbine system.

BACKGROUND OF THE INVENTION

Current unmanned aerial vehicles (UAVs) employ propellers to provide lift for the UAV. The propellers are located externally to the body. This is unsafe as the propellers spin at high speed and can significantly damage people, animals, property, etc. that come into contact with the propellers. Additionally, the propellers create a large amount of noise. Thus, a need exists for a UAV that is safer and quieter than a traditional UAV.

BRIEF SUMMARY OF THE INVENTION

According to an embodiment of the present disclosure, a propeller-less unmanned aerial vehicle may include a ducted body having a plurality of channels; an inlet formed in the ducted body and configured to allow air flow to enter the plurality of channels from an exterior of the ducted body; an anechoic chamber formed in the ducted body and coupled to the plurality of channels; a rotor comprising a plurality of angled fins located in the anechoic chamber; a control system configured to direct air flow within the plurality of channels; and one or more circular tubes coupled to the exterior of the ducted body and in communication with the plurality of channels. The air may flow into the ducted body through the inlet, into the plurality of channels and the anechoic chamber, and exits through the one or more circular tubes to provide lift and directional control to the propeller-less unmanned aerial vehicle.

According to an embodiment, a method for controlling a propeller-less unmanned aerial vehicle may include providing a propeller-less unmanned aerial vehicle with a body, the body having a plurality of internal channels; providing an air inlet in the center of the body; flowing air through the air inlet and into the plurality of internal channels to an anechoic chamber; accelerating the air flow through the anechoic chamber with a rotor located in the anechoic chamber; directing the accelerated air flow through the plurality of internal channels to an air outlet; discharging the air through one or more circular tubes coupled to an exterior of the body; and controlling the direction, thrust, and/or lift of the propeller-less unmanned aerial vehicle.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 shows schematics of an unmanned aerial vehicle, according to an embodiment of the disclosure;

FIG. 4A shows a schematic of an unmanned aerial vehicle, according to an embodiment of the disclosure; and FIG. 4B shows a schematic of an end of an unmanned aerial vehicle, according to an embodiment of the disclosure.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. A person skilled in the relevant art would recognize that other equivalent parts can be employed and other methods developed without departing from the spirit and scope of the invention. All references cited herein are incorporated by reference as if each had been individually incorporated.

The present disclosure relates to a propeller-less unmanned aerial vehicle (UAV). The UAV has an airframe body having a plurality of internal ducts and/or channels to allow air flow through the body of the UAV. The UAV has internal fans and/or propellers for accelerating the air flow toward substantially tubular outlets. Air exits the substantially tubular outlets providing directional control and thrust for the UAV. The tubular outlets and/or the internal propellers may be modular such that the UAV may be customized to the particular task, flying distance, flying environment, etc.

Figure 1:
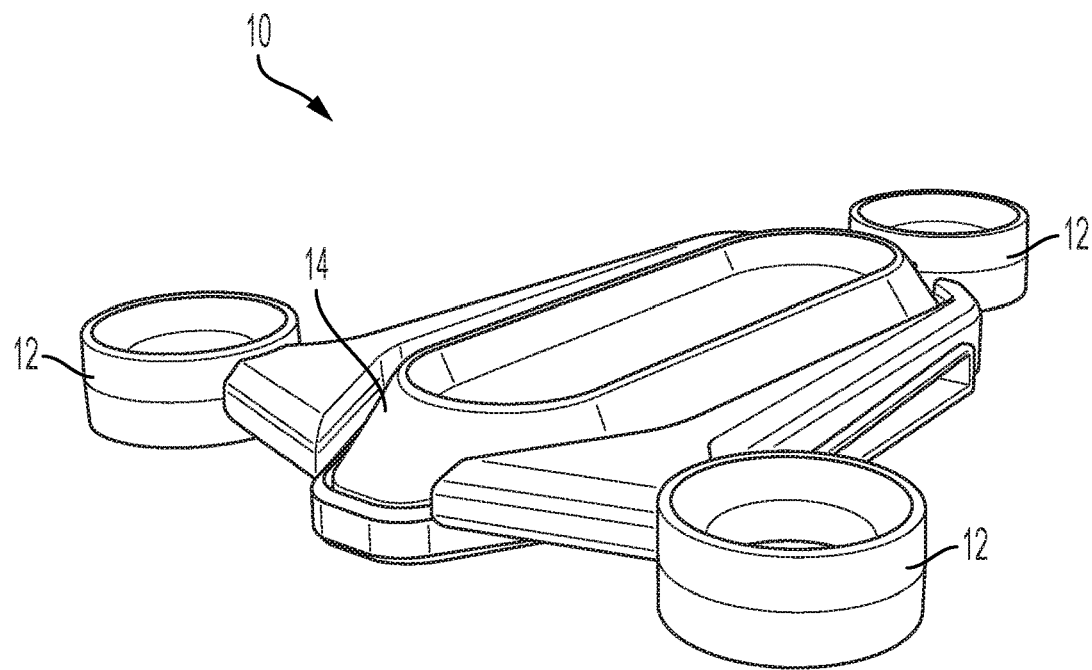
FIG. 1 shows an unmanned aerial vehicle, according to an embodiment of the disclosure.

Referring to FIG. 1, an exemplary unmanned aerial vehicle (UAV) 10 is depicted. The UAV 10 may include one or more circular tubes 12 attached to an airframe of the UAV 10. The airframe may be a ducted body 14. The ducted body 14 may include an internal network of air channels or ducts and anechoic chambers. The airframe may have one or more air inlets which allow air to flow into the ducts of the airframe. The one or more circular tubes 12 may operate as outlets for air flowing through the internal ducts. The one or more circular tubes 12 may be controlled to rotate with respect to the airframe discharging the air in a predetermined direction. Thus, as may be appreciated in the description to follow, air is admitted into the airframe ducted body 14 by an air inlet, the air flows through the internal network of ducts in the airframe, and exits through the one or more circular tubes 12 to provide thrust, lift, and/or directional control to the UAV 10.

As previously discussed, the UAV 10 may include an airframe having a ducted body 14 including an internal network of air channels or ducts. The ducts may connect the air inlet to the one or more circular tubes 12. The ducts may extend from the one or more air inlets to the one or more circular tubes. For example, where there are four circular tubes 12 (see, for example, FIG. 3), there may be a corresponding duct communicating with one or more air inlets. The ducts may be fixed within the ducted body 14 such that a first number of predetermined ducts are provided for propulsion and second number of predetermined ducts are provided for directional control. Alternatively, the ducts may be rotating, such that they may control propulsion or direction based on commands from a user and/or central control system.

As may be appreciated, the number and location of circular tubes 12 and associated internal ducts, may be selected based on the number of degrees of control. For example, where it is desired to control thrust, lift, roll, pitch, and yaw, a predetermined number of circular tubes 12 may be provided. In the exemplary embodiment of FIG. 3, four circular tubes 12 are provided. The circular tubes 12 may be angled or otherwise rotated with respect to the airframe to control the direction and lift of the UAV 10.

The UAV 10 may be a propeller-less UAV. That is, the UAV 10 may have no external propellers. Instead, referring to FIG. 2, one or more propellers 16 may be provided in internal chambers 18, disposed within the internal ducts of the ducted body 14. The chambers 18 may be anechoic or semi-anechoic chambers. The chambers 18 may be adjacent to the one or more circular tubes 12 such that air flow exiting the chambers 18 flows through a respective circular tube 12.

The propellers 16 may be driven to rotate by a motor (not depicted), such as a brushless electric motor. Each propeller 16 may be controlled by an individual motor associated with each propeller 16. The UAV 10 may include servos attached to the motor. Commands sent from an onboard controller (e.g. a computer and/or control system) to the servo may control the motor and thus control the propellers 16. The UAV 10 may include one propeller 16 (inside a chamber 18) for each circular tube 12 provided. The fins of the propellers 16 may be asymmetric such that they harmonize with each other. Thus, the noise may be reduced. The noise may be further reduced by the presence of the anechoic or semi-anechoic chamber 18.

The propellers 16 may also include an aerodynamic diffuser 20 near the outlet of the propeller 16 for separating the air into controlled flows, depicted as arrows A. The air may then be channeled equally from the propeller 16 into the sides of the circular tube 12, in the direction of arrows A.

Figure 2:
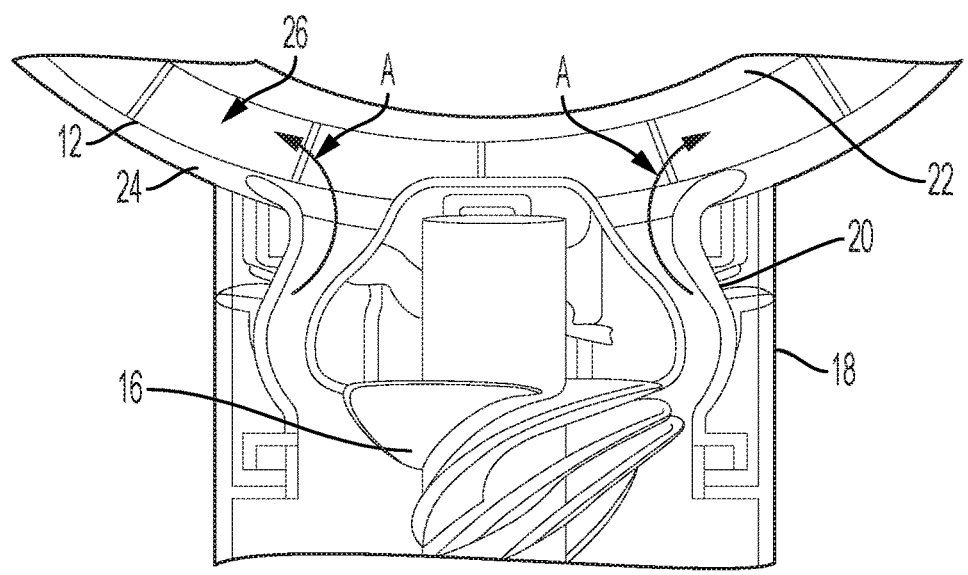
FIG. 2 shows an internal chamber of an unmanned aerial vehicle, according to an embodiment of the disclosure.

In use, air may flow into the air inlet of the ducted body 14. The air may flow through the internal ducts until the air reaches a chamber 18. The air may be moved by the propeller 16 located in the chamber 18 toward the associated circular tube 12. The diffuser attached to the outlet of the propeller 16 may separate the air flow into controlled flow paths and direct the air equally to the sides of the circular tube 12, as best shown in FIG. 2. The circular tube 12 may be constructed of two loops 22, 24. The two loops 22, 24 may converge at an outlet (not depicted) on an opposing end of the circular tube 12 from the propeller 16. The two loops 22, 24 may gradually become closer such that an area 26 between the two loops 22, 24 reduces from a location adjacent the propeller 16 to the outlet of the circular tube 12. The reduction in the area 26 may increase the pressure of the air flow from where the air enters the two loops 22, 24 near the propeller 16 to where the air exits at the outlet of the two loops 22, 24. The increased pressure of the air may force air out of the outlet of the two loops 22, 24. As the air flow exits the outlet of the circular tube 12, the air clings to the air foil shape generating maximum velocity. Surrounding air is then drawn into the air, amplifying the air projected out of the circular tube 12. The high velocity air flow exiting from the circular tube 12 may be used to control thrust, lift, roll, pitch, and yaw of the UAV 10.

For example, referring to FIG. 3, the circular tubes 12 may be attached to the ducted body 14 by a connecting member 28. The connecting member 28 may be controlled to rotate with respect to the ducted body 14 to control a direction of the UAV 10. Alternatively, referring to FIG. 4A, the circular tubes 12 themselves may be controlled to rotate with respect to the ducted body 14 to control a direction of the UAV 10. Alternatively, the circular tubes 12 may be controlled to rotate and may also include a connecting member 28 controlled to rotate. The UAV 10 may include an onboard controller for controlling the direction of the connecting member 28 and/or the circular tubes 12.

Referring to FIGS. 4A and 4B, the ducts or channels may be molded into the body 14 to form an overall air foil shape to the UAV 10. FIG. 4B shows a profile of the air foil shaped UAV of FIG. 4A. In this example, the chambers (not depicted) may have outlets 32 which are aligned with one or more circular tubes 12. The flow of air through the body 14, through outlets 32, and through circular tubes 12 maybe similar or the same as previously described. As previously mentioned, the circular tubes 12 may be rotated to control the direction of the UAV 10. Referring to FIG. 4B, it can be seen that the generally cross-sectional shape of the UAV 10 is that of an air foil. This shape facilitates air flow around the UAV 10 and enhances the efficiency of the UAV 10 by reducing turbulence around the body 14 of the UAV 10.

It may be appreciated that in any of the foregoing exemplary UAVs 10, the circular tubes 12 may be any shape and need not be circular. The circular tubes 12 may be any shape that allows air flow to spread into the entire body and compress the air to accelerate the air to a higher velocity at the outlet of the tube 12. Additionally, the ducted body 14 may include a cooling system, such as additional compression devices to further increase the pressure of the air flow, thus increasing the velocity of the air flow through the UAV 10, and in turn increase the thrust of the UAV 10. For example, the ducts and/or channels of the ducted body 14 may include a series of loops or a series of fans that increase the pressure of the air flowing therethrough. Alternatively, or additionally, the ducts and/or channels may be provided with pressurized canisters, $CO_2$ cartridges, cooled loops, eutectic plates, an AC system, aerosol system, and/or liquid cooling to further compress and/or pressurize the air flowing through the ducted body 14.

The ducted body 14 may also include control devices, such as valves, to control the direction of flow through the ducted body 14. The valves may be shut off valves, or variable degree valves which allow for partial opening/closing of the valve. Thus, as may be appreciated, the onboard controller of the UAV 10 may open, close, or partially open or partially close valves within the ducted body 14 to direct and/or redirect air flow to a particular circular tube 12. In this manner, if the UAV 10 is to turn left, the onboard controller may close or partially close valve(s) leading to the circular tubes 12 on the left side of the UAV 10 and open or partially open valve(s) leading to the circular tubes on the right side of the UAV 10. This may allow more thrust to the right side of the UAV 10 causing the UAV 10 to bank to the left. Similar techniques may be provided to cause the UAV 10 to fly higher or lower. This technique may be used in combination with rotation of the connecting member 28 and/or the rotation of the circular tubes 12. It may be appreciated that the many degrees of control allows for finer control of the movement of the UAV 10.

The UAV 10 may also include one or more sensors to monitor the pressure, temperature, velocity, etc. of the air flow through the ducted body 14. The sensors may communicate with the onboard controller. The onboard controller may open and/or close valves and/or rotate the connecting member 28 and/or rotate the circular tubes 12 in response to a signal from the one or more sensors.

The UAV 10 may be modular. That is, the circular tubes 12 and chambers 18 including propellers 16 may be formed as propulsion units. The propulsion units may be added or removed from the airframe (ducted body 14) of the UAV 10 based on a particular task, travel distance, travel environment, payload capacity, etc. The propulsion units may snap, connect, attach, or otherwise couple to the body 14. See for example, FIG. 4A, showing an end 30 with a propulsion unit omitted. Where the propulsion unit is omitted from end 30, a control device may be included to prevent flow into and out of the body. The ducted body 14 may include a plurality of control devices, such as valves, for closing off ducts when propulsion units are not provided at the outlet of a particular duct. In this manner, the UAV 10 may be customized for a desired use. For example, if the UAV 10 is to travel 10 miles to deliver a package, additional propulsion units may be provided. If the UAV 10 is to travel 1 mile to deliver a package, fewer propulsion units may be provided. Similarly, where the package and/or payload is heavier, more propulsion units may be provided than where the package and/or payload is lighter. Each modular propulsion unit may be rechargeable when not in use with the UAV 10. Furthermore, each modular propulsion unit may include a transceiver to talk to the onboard controller, a battery pack, ducting to mate with the ducting in the ducted body 14, propellers 16, and/or a motor. By providing modular propulsion units, the number of propulsion units is not fixed and may be tailored to a particular task (e.g. low speed and/or low altitude). The number of propulsion units may be determined to be specific to each task.

Propeller-less UAVs, such as the one previously described, are 40% more efficient than traditional fan designs. The aforementioned UAVs may reduce noise, improved efficiency, and improve safety, as compared to traditional fan design UAVs. The UAV described herein may be safer because the motor and fan-powered turbine are contained within a housing of the UAV body. Thus, the fans are contained, not exposed.

Although the foregoing description is directed to the preferred embodiments of the invention, it is noted that other variations and modifications will be apparent to those skilled in the art and may be made without departing from the spirit or scope of the invention. Moreover, features described in connection with one embodiment of the invention may be used in conjunction with other embodiments, even if not explicitly stated above.

We claim:

1. A propeller-less unmanned aerial vehicle, the unmanned aerial vehicle comprising:
    a ducted body having a plurality of channels, the plurality of channels include at least one pressurized canister, and the plurality of channels are molded into the ducted body to form an overall air foil shape;
    an inlet formed in the ducted body and configured to allow air flow to enter the plurality of channels from an exterior of the ducted body;
    an anechoic chamber formed in the ducted body and coupled to the plurality of channels;
    a rotor comprising a plurality of angled fins located in the anechoic chamber;
    a control system configured to direct air flow within the plurality of channels;
    one or more circular tubes coupled to the exterior of the ducted body and in communication with the plurality of channels; and
    at least one valve of the ducted body, the control system is configured to control air flow by instructing at least one of an opening, a partial opening, and a closing of the at least one valve,
    wherein air flows into the ducted body through the inlet, into the plurality of channels and the anechoic chamber, and exits through the one or more circular tubes to provide lift and directional control to the propeller-less unmanned aerial vehicle.

2. The propeller-less unmanned aerial vehicle of claim 1, further comprising a plurality of anechoic chambers having rotors, wherein the plurality of anechoic chambers are aligned with a plurality of directions of control.

3. The propeller-less unmanned aerial vehicle of claim 1, further comprising a cooling system within the plurality of channels.

4. The propeller-less unmanned aerial vehicle of claim 3, wherein the cooling system is one of an air conditioning system, liquid cooling, or aerosol.

5. The propeller-less unmanned aerial vehicle of claim 1, further comprising a plurality of sensors coupled to the ducted body, wherein the plurality of sensors monitor an amount of pressurized air in the propeller-less unmanned aerial vehicle.

6. The propeller-less unmanned aerial vehicle of claim 1, wherein the control system, the at least one valve is a shut off valve configured to redirect air flow through the plurality of channels.

7. A method for controlling a propeller-less unmanned aerial vehicle, the method comprising:
    providing a propeller-less unmanned aerial vehicle with a body, the body having a plurality of internal channels, the plurality of internal channels include at least one pressurized canister, and the plurality of internal channels are molded into the body to form an overall air foil shape;
    providing an air inlet in a center of the body;
    flowing air through the air inlet and into the plurality of internal channels to an anechoic chamber;
    accelerating the air flow through the anechoic chamber with a rotor located in the anechoic chamber;
    directing the accelerated air flow through the plurality of internal channels to an air outlet;
    discharging the air through one or more circular tubes coupled to an exterior of the body; and
    controlling a direction, thrust, and/or lift of the propeller-less unmanned aerial vehicle, the controlling including controlling air_flow by instructing at least one of an opening, a partial opening, and a closing of at least one valve of the body.

8. The method of claim 7, wherein controlling the direction of the propeller-less unmanned aerial vehicle includes at least one of: adjusting a position of the one or more circular tubes and controlling a connected member to which the one or more circular tubes are coupled.

9. The method of claim 7, further comprising monitoring an amount of pressurized air in the propeller-less unmanned aerial vehicle.

10. The method of claim 7, wherein the body is a ducted body and wherein the plurality of internal channels form a network of air channels.

11. The propeller-less unmanned aerial vehicle of claim 1, wherein the inlet, anechoic chamber, and rotor form a modular propulsion unit.

12. The propeller-less unmanned aerial vehicle of claim 11, wherein the ducted body is provided with one or more modular propulsion units, and wherein a number of modular propulsion units is selected based on a use of the propeller-less unmanned aerial vehicle.

13. The propeller-less unmanned aerial vehicle of claim 1, wherein the one or more circular tubes are configured to rotate with respect to the ducted body to control the lift and directional control of the propeller-less unmanned aerial vehicle.

14. The propeller-less unmanned aerial vehicle of claim 1, further comprising no external propellers.

15. The propeller-less unmanned aerial vehicle of claim 1, wherein the rotor includes asymmetric fins configured to harmonize with each other.

16. The propeller-less unmanned aerial vehicle of claim 15, wherein the asymmetric fins and anechoic chamber are configured to reduce noise as compared to a fanned unmanned aerial vehicle.

17. The propeller-less unmanned aerial vehicle of claim 1, wherein the plurality of channels form a network of internal air channels within the ducted body.

18. The propeller-less unmanned aerial vehicle of claim 1, wherein the plurality of channels are fixed within the ducted body.

19. The propeller-less unmanned aerial vehicle of claim 5, wherein the control system is further configured to:
- receive a plurality of signals from the plurality of sensors monitoring the amount of pressurized air in the propeller-less unmanned aerial vehicle; and
- control at least one of (i) the air flow of the at least one valve and (ii) a rotation of the one or more circular tubes in response to receiving the plurality of signals.

* * * * *